United States Patent [19]

Franz

[11] 4,397,098
[45] Aug. 9, 1983

[54] METHOD AND APPARATUS FOR ZEROING A TILT METER MECHANISM

[75] Inventor: Klaus L. Franz, Santa Cruz, Calif.

[73] Assignee: Applied Geomechanics, Inc., Santa Cruz, Calif.

[21] Appl. No.: 294,571

[22] Filed: Aug. 20, 1981

[51] Int. Cl.³ .............. G01C 9/28; E21B 47/022
[52] U.S. Cl. ............................. 33/304; 33/1 H; 33/386
[58] Field of Search ............ 33/1 H, 304, 312, 349, 33/366, 384, 385, 386, 387; 73/1 E

[56] References Cited

U.S. PATENT DOCUMENTS

| 1,141,325 | 6/1915 | Ewer | 33/385 |
| 1,745,252 | 1/1930 | Ginter | 33/386 |
| 2,451,443 | 10/1948 | Merten | 33/304 |
| 3,486,238 | 12/1969 | Hansen | 33/366 |
| 3,555,691 | 1/1971 | Jacoby | 33/312 |
| 3,789,510 | 2/1974 | Richter, Jr. et al. | 33/304 |
| 4,040,189 | 8/1977 | LaCoste | 33/312 |

FOREIGN PATENT DOCUMENTS

| 68644 | 2/1949 | Denmark | 33/386 |
| 1623411 | 1/1971 | Fed. Rep. of Germany | 33/387 |
| 52-29256 | 3/1977 | Japan | 33/366 |

Primary Examiner—Richard R. Stearns
Attorney, Agent, or Firm—Paul L. Hickman

[57] ABSTRACT

An improved tilt meter mechanism characterized by a pyramidal pendulum support for a tilt sensor, and means for leveling the support to zero the sensor. A pair of motor driven gibs movable along vertical rails are provided, and a biasing mechanism urges angled faces of the support firmly against the gibs. To zero the tilt sensor, the motors associated with the gibs are individually actuated to move the gibs in directions substantially normal to the X-Y measurement plane of the sensor to bring the X-Y measurement plane into alignment with a gravitationally normal reference plane.

16 Claims, 2 Drawing Figures

METHOD AND APPARATUS FOR ZEROING A TILT METER MECHANISM

1. FIELD OF THE INVENTION

This invention relates generally to measurement devices and more particularly to devices for detecting or measuring minute tilt variations.

2. Description of the Prior Art

Tilt meters of the type disclosed in this invention are typically used to detect minute shifts in the earth's strata. The tilt meter is usually housed in a long, cylindrical enclosure that is buried vertically in the ground. A shift in the strata underlying the tilt meter will minutely shift the enclosure, as detected by an enclosed tilt sensor.

A common type of tilt sensor is known as a Rockwell movement, and includes a sealed case enclosing four equally spaced, orthogonal platinum electrodes, and a central platinum reference electrode. The case is filled with a conducting fluid containing a bubble which, when leveled with respect to a gravitationally normal plane, covers an equal area of the orthogonal electrodes. As the case is shifted the orthogonal electrodes are unevenly covered resulting in different resistances between the orthogonal electrodes and the reference electrode. Electronics are connected to the tilt sensor to convert these variations in resistance to degrees of tilt in an X-Y plane. Within certain limits, the output of the Rockwell movement is a linear function of the tilt.

To zero the tilt meter the X-Y measurement plane of the tilt sensor must be aligned with a gravitationally normal reference plane. In the prior art this was accomplished by moving the entire enclosure of the tilt meter until the bubble within the Rockwell movement was centered. This was a time consuming and inaccurate process.

SUMMARY OF THE INVENTION

The major object of this invention is to provide a tilt meter mechanism that can be zeroed easily and efficiently.

Briefly, the invention comprises a tilt sensor, a pendulous support member for the tilt sensor, and means for leveling the tilt sensor by adjusting the position of the support member. The support member takes the form of an inverted, four sided pyramid having an axis normal to an X-Y reference plane of the tilt sensor, and has at least two faces forming acute angles relative the axis. The means for leveling the support member includes a pair of rails substantially parallel to the axis of the support member, and gibs slidingly coupled to the rails and adapted to abut the acute faces of the pyramidal support member. A pair of motors are associated with the gibs and are operative to drive the gibs up and down the rail. Biasing means are provided to urge the acute faces of the support member into firm contact with the gibs.

When the tilt meter mechanism is first planted in the ground chances are that the sensor is not leveled. To level the sensor and thus zero the sensor's output the X-Y measurement plane of the sensor must be brought into alignment with a gravitationally normal reference plane. This is accomplished by individually actuating the motors to drive the gibs up and down their rails. Since one of the gibs abuts a face of the pyramidal support which projects an x component onto the sensor's X-Y plane, and the other gib abuts a face of the pyramidal support which projects a y component onto the X-Y plane, the sensor's X-Y plane can be adjusted to be gravitationally normal.

An advantage of this invention is that a tilt sensor can be quickly, easily and efficiently leveled.

A further advantage of this invention is the mechanical simplicity of the leveling mechanism.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
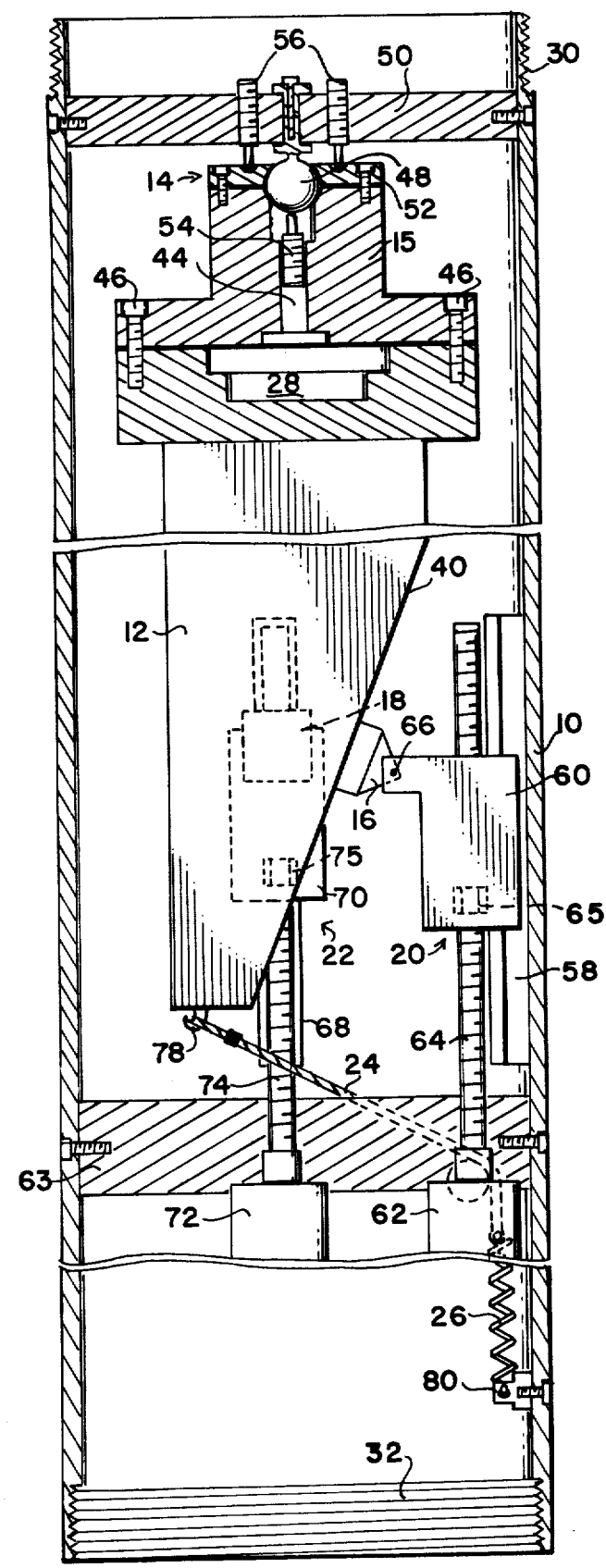
FIG. 1 is a partially sectioned elevational view of the present invention.

Referring generally to the figures, a tilt meter mechanism in accordance with the present invention includes a casing 10, a pendulous sensor support 12, a tooling ball assembly 14 suspending a support cap 15 attached to the top of support 12, a pair of gibs 16 and 18 in sliding abutment with the sensor support, means 20 and 22 for moving the gibs along surfaces of the sensor support, and a cable 24 and spring 26 for biasing the sensor support against the gibs. A tilt sensor 28, preferably of the aforementioned Rockwell movement type, is fully enclosed within a chamber provided between the support 12 and the support cap 15.

The casing 10 is a long, hollow, cylindrical tube provided with external threads 30 at its upper end and internal threads 32 at its lower end. A lower end cap (not shown) is engaged with threads 32, and an upper casing section (also not shown) containing the electronics associated with the tilt meter mechanism engages threads 30. The casing can be made from a variety of materials including stainless steel and anodized aluminum.

Figure 2:
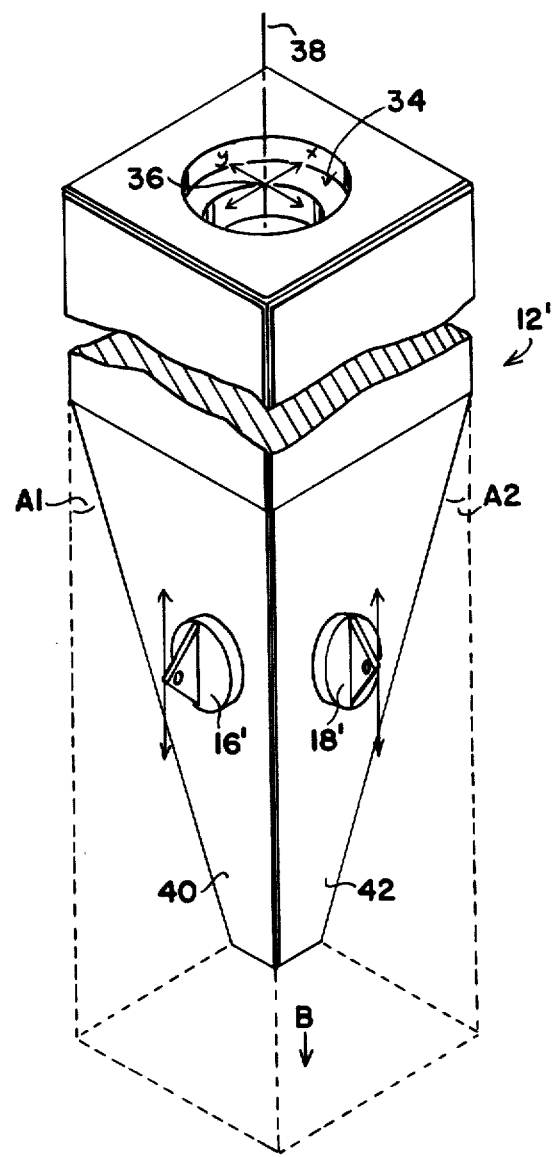
FIG. 2 is a partial orthographic projection of a pyramidal support pendulum slightly different from the one shown in FIG. 1.

With special reference to FIG. 2, a simplified drawing of support 12' shows an elongated, irregular, inverted pyramid provided with a recess 34 in its upper surface to accomodate the tilt sensor 28. The tilt sensor defines an X-Y measurement plane as indicated at 36, and the support 12 has an axis 38 normal to the X-Y plane 36.

In the present embodiment, the support has four faces including two mutually perpendicular surfaces or faces 40 and 42. Face 40 forms an acute angle A1 with the axis 38, and face 42 forms an acute angle A2 with the axis 38. As noted in the figure, face 40 projects an x component onto the X-Y plane, and face 42 projects a y component onto the X-Y plane. Support 12 is preferably fairly massive to provide good stability, but may be made from any suitable material.

Support cap 15 is a flanged structure provided with a central threaded bore 44, and is attached to the top of the support 12 by a number of machine bolts 46. The support cap cooperates with the support to firmly hold sensor 28 in position.

The tooling ball assembly 14 includes a tooling ball 48 suspended from a plate 50, a tooling ball clamp 52 attaching the tooling ball to the top of cap 15, and a spring plunger assembly 54 disposed within threaded bore 44 and contacting the tooling ball. The tooling ball assembly allows the support member 12 to move in an overdamped fashion, i.e. the support member can freely move in an X-Y direction but it cannot oscillate. A number of spring plungers 56 engage threaded bores provided in plate 50 and contact shallow depressions provided in the upper surface of clamp 52 to prevent the support 12 from rotating around the tooling ball.

The gibs 16 and 18 are adapted to slidingly abut surfaces or faces 40 and 42, respectively, and are preferably made from a material that can take a hard, smooth finish such as brass. They can take a variety of geometric forms, such as square as shown at 16 and 18 in FIG. 1, or round as shown at 16' and 18' in FIG. 2.

Means 20 includes a rail 58, a slide 60 engaged with the rail, a reversible motor 62 supported by a motor mount 63, and a lead screw 64 coupling the shaft of motor 62 to a nut 65 loosely held within the slide 60. A pivot 66 connects the slide to gib 16.

Similarly, means 22 includes a rail 68, a slide 70 engaged with the rail, a reversible motor 72 supported by motor mount 63, and a lead screw 74 coupling the shaft of motor 72 to a nut 75 loosely held within slide 70. A pivot 76 attaches the slide 70 to gib 18.

Cable 24 has a first end looped around a tang 78 connected to the bottom of support 12, and has its second end connected to a first end of spring 26. The second end of the spring engages a spring post 80 fastened to casing 10. The spring and cable biases the support 12 towards the gibs, as indicated at B in FIG. 2. Of course, other biasing mechanisms are also possible, including a weight attached to the end of the cable instead of the spring.

The output of the sensor 28 is coupled to electronics which typically develop an X-Y display on an oscilloscope screen. A spot on the screen indicates the present position of the X-Y measurement plane of the sensor. When the spot is centered at the origin on the screen, the sensor is zeroed and the X-Y measurement plane is in alignment with a gravitationally normal plane. Any subsequent shift from the origin would be caused by a shift in the underlying strata and would correspond to the desired measured tilt.

To use the present device, the tilt mechanism is first planted as vertically as possible in the ground. The oscilloscope screen is then viewed to see which direction the sensor support has to be nudged to zero or level the sensor. Motors 62 and 72 are then individually actuated to move the gibs up and down to align the X-Y measurement plane of the sensor with a gravitationally normal plane. When the spot on the oscilloscope screen is at the origin the sensor is successfully zeroed.

In summary, the method of this invention is to support a sensor having an X-Y measurement plane on a pivotal support member having faces angled relative the X-Y plane, and then moving gibs along the angled faces and substantially normal to the X-Y plane so as to align the X-Y plane with a gravitationally normal plane.

While this invention has been described in terms of a few preferred embodiments, it is contemplated that persons reading the preceding descriptions and studying the drawing will realize various alterations, permutations and modifications thereof. For example, the support for the sensor need not be pendulous, but rather could be pivotally supported at its base. Further, the support can take on a variety of surface configurations as long as surfaces are provided which project an x and a y component on the X-Y measurement plane of the sensor.

It is therefore intended that the following appended claims be interpreted as including all such alterations, permutations and modifications as fall within the true spirit and scope of the present invention.

What is claimed is:

1. In a tilt meter including a tilt sensor for detecting movement in an X-Y plane, means for aligning said X-Y plane of said tilt sensor with a gravitationally normal reference plane, and means for detecting when said X-Y plane has shifted relative said reference plane, an improved means for aligning said tilt sensor comprising:
    (a) means supporting said tilt sensor such that said X-Y plane is movable through said reference plane, said supporting means having an axis normal to said X-Y plane, a first surface forming an acute angle relative said axis and projecting an x component along said X-Y plane, and a second surface forming an acute angle relative said axis and projecting a y component along said X-Y plane;
    (b) first means in sliding abutment with said first surface, and second means in sliding abutment with said second surface; and
    (c) control means for selectively moving said first means and said second means in directions parallel to said axis, whereby said X-Y plane may be aligned with said reference plane.

2. A tilt meter as recited in claim 1 wherein said first surface and said second surface are planar and are normal relative one another.

3. A tilt meter as recited in claim 2 wherein said supporting means is a pendulum in the shape of an inverted pyramid.

4. A tilt meter as recited in claim 3 wherein said first means and said second means each include a rail parallel to said axis, a gib adapted to abut said pyramid, and wherein said control means includes means for driving said gib up and down said track.

5. A tilt meter mechanism comprising:
    (a) a tilt sensor for detecting movement in an X-Y plane;
    (b) means supporting said tilt sensor such that said X-Y plane is movable through a gravitationally normal reference plane, said supporting means having a first surface angled relative said X-Y plane and projecting an x component along said X-Y plane, and a second surface angled relative said X-Y plane and projecting a y component along said X-Y plane;
    (c) first means in abutment with said first surface, and second means in abutment with said second surface; and
    (d) first control means for moving said first means along said first surface in a direction normal to said X-Y plane, and second control means for moving said second means along said second surface in a direction normal to said X-Y plane.

6. A tilt meter mechanism as recited in claim 5 further comprising biasing means urging said supporting means against said first means and said second means.

7. A tilt meter mechanism as recited in claim 6 wherein said supporting means is pyramidal, whereby said first surface and said second surface are faces of said pyramidal supporting means.

8. A tilt meter mechanism as recited in claim 7 wherein said first control means includes a first elongated track normal to said X-Y plane, means coupling said first means to said first track, and means for driving said first means up and down said first track; and wherein said second control means includes a second elongated track normal to said X-Y plane, means coupling said second means to said second track, and means for driving said second means up and down said second track.

9. A tilt meter mechanism as recited in claim 8 wherein said means for driving said first means includes a first motor, and a first drive screw coupling said first motor to said first means; and wherein said means for driving said second means includes a second motor and a second drive screw coupling said second motor to said second means.

10. A tilt meter mechanism as recited in claim 6 wherein said supporting means is suspended in a pendulum fashion.

11. A tilt meter mechanism as recited in claim 10 further comprising overdamping means to prevent oscillation of said pendulous supporting means.

12. A tilt meter mechanism as recited in claim 10 further comprising means for preventing said pendulous supporting means from rotating around an axis normal to said X-Y plane.

13. A tilt meter mechanism as recited in claim 5 wherein said supporting means has an axis normal to said X-Y plane, and wherein said first surface and said second surface form acute angles relative said axis.

14. A tilt meter mechanism as recited in claim 13 wherein said acute angles are between eight degrees and 27 degrees, inclusive.

15. A method of aligning a tilt meter mechanism including a tilt sensor for detecting movement in an X-Y plane, means supporting said tilt sensor such that said X-Y plane is movable through a gravitationally normal reference plane, said supporting means having a first surface angled relative said X-Y plane and having an x component relative thereto, and a second surface angled relative said X-Y plane and having a y component relative thereto, a first gib in abutment with said first surface, and a second gib in abutment with said second surface, said method for aligning said X-Y plane with said reference plane comprising:
  (a) moving said first gib along said first surface in a direction substantially normal to said X-Y plane; and
  (b) moving said second gib along said second surface in a direction substantially normal to said X-Y plane.

16. A method as recited in claim 15 further comprising the step of biasing said support means against said first gib and said second gib.

* * * * *